Patented Feb. 23, 1954

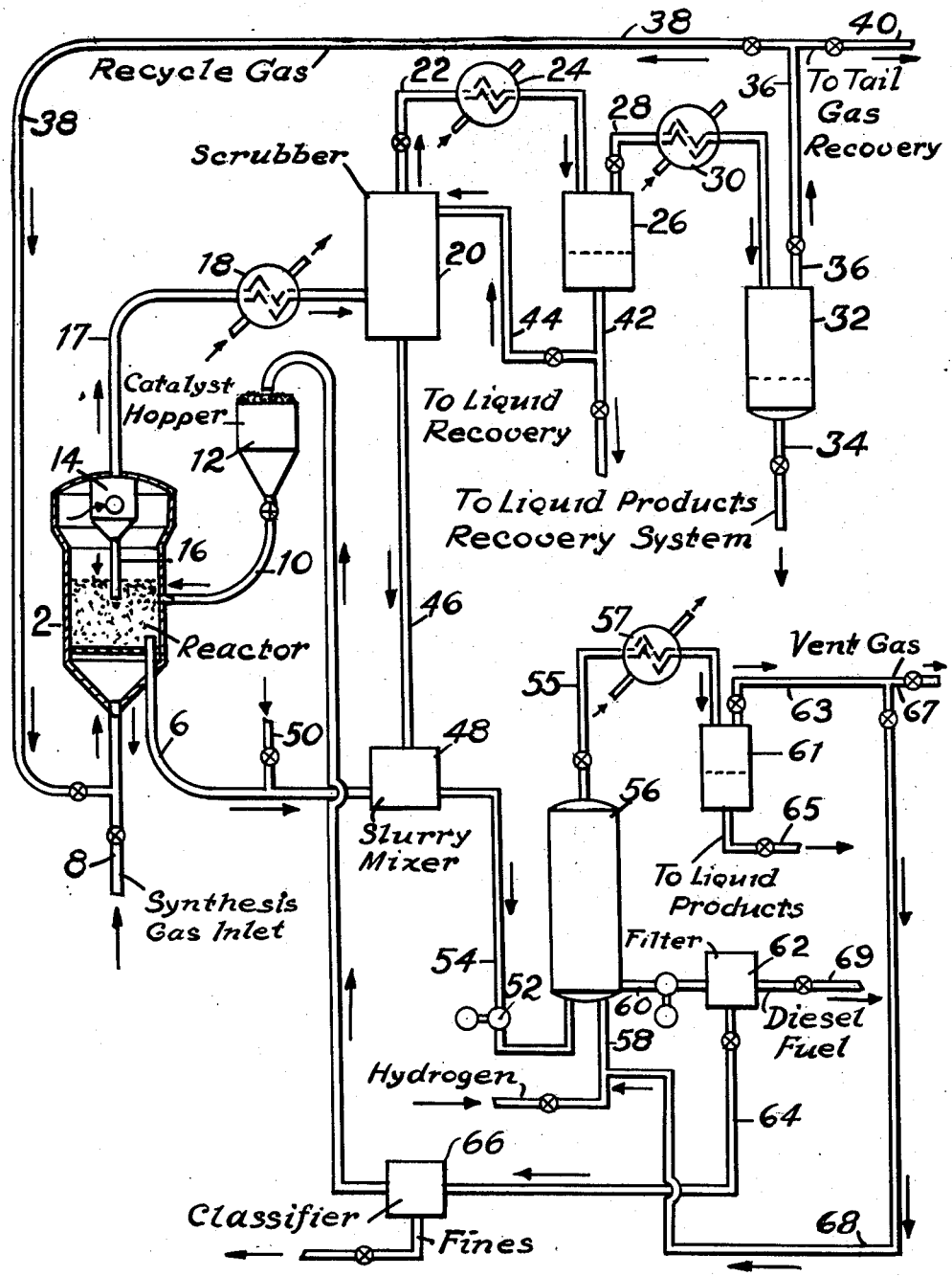

2,670,364

UNITED STATES PATENT OFFICE 2,670,364

REGENERATION OF IRON HYDROCARBON SYNTHESIS CATALYST

Charles E. Hemminger, Westfield, N. J., assignor to Standard Oil Development Company, a corporation of Delaware Application October 30, 1948, Serial No. 57,512

5 Claims. (Cl. 260—449.6)

The present invention relates to the synthesis of hydrocarbons from carbon oxides and hydrogen in the presence of a suitable iron catalyst. This invention relates more particularly to the treatment of a powdered catalyst associated with an oily hydrocarbonaceous and waxy material, wherein the catalyst is cleansed and valuable oily and waxy materials are recovered.

The synthesis of hydrocarbons and other valuable products from gas mixtures containing various proportions of hydrogen and carbon oxides, particularly carbon monoxide, both in fixed bed as well as in dense phase fluid catalyst operation is well known in the art. The character and quality of the synthesis product depends largely on the temperatures, pressures, $H_2:CO$ ratios of the feed gas and the nature of the catalyst used, the latter being usually an iron group metal catalyst promoted with such promoters as various alkali metal compounds, rare earth metal oxides, magnesia, alumina, etc. in amounts of about 0.5–10%. Thus cobalt catalysts promoted with thoria and/or magnesia have been used at relatively low pressures of about 15–75 p. s. i. g. and relatively low temperatures of about 350° to 450° F. and high $H_2:CO$ ratio of 2 or more to produce a substantially saturated hydrocarbon material from which valuable diesel fuels, lubricating oils, and waxes may be obtained. Iron-type catalysts, usually promoted with a suitable alkali metal compound, such as carbonates, halides, etc. of potassium or sodium may be used in combination with relatively high pressures up to 600 to 700 p. s .i. g. and temperatures of 450° to 750° F., and lower $H_2:CO$ ratios generally not above 2, to produce predominantly unsaturated material from which large proportions of high octane motor fuels may be recovered.

While it has thus been possible to obtain high octane motor fuels in good yields by this process, it has also been found that operations under conditions that favor good yields of useful (i. e., $C_4+$oil) products are accompanied by excessive deposition of carbon and carbonaceous material upon the catalyst. This carbon deposition is a serious problem, both when the catalytic operation is carried out by the fixed bed and the fluid catalyst technique, which latter, because of better heat distribution, transfer and control and because of the more intimate mixing and contact of the catalyst with the reactants, is considered far superior to fixed bed processes for effecting the catalytic synthesis of hydrocarbons. However, two problems that arise in conjunction with the fluid solids type of operation are the fouling and consequent inactivation of the catalyst by formation and deposition of waxy materials and the tendency of catalyst particles to agglomerate as a result of the wax formation and deposition. Wax deposition due to catalyst inactivation not only cuts down product yield but causes poor fluidization of the catalyst, poor temperature control, agglomeration and conditions requiring shut down of the plant.

The present invention is particularly concerned with the removal of waxy material from a catalyst used in the synthesis of hydrocarbons in a fluid solids type operation.

As stated above, one of the principal problems in the application of the fluid catalyst technique to the synthesis of hydrocarbons from CO and $H_2$ has been the accumulation of wax or heavy oil on the catalyst. In the fixed bed operation this was not a serious problem; because of the downflow, the wax drains off the catalyst, and wax could be allowed to collect to the extent of 100 to 150% by weight of catalyst before activity of the catalyst was seriously impaired, and consequently wax removal was required only at infrequent intervals such as every 30 or 60 days. Also, particle motion was not important. However, in the fluid type of operation the accumulation of wax on the catalyst interferes with proper fluidization of the catalyst long before the wax content of the catalyst is sufficient to interfere seriously with the activity thereof. One of the ways wherein wax interferes with fluidization is by accumulation on any relatively cold walls. Fine catalyst particles make contact with this wax, are wetted thereby, and the resulting agglomerate falls into the reactor and causes poor fluidization and/or coking and caking. Thus it has been found, for example, in a fluid type operation that only about 20 to 25 weight percent of wax can be tolerated on the catalyst before it causes sticking together of the catalyst particles, thus preventing proper aeration and fluidization which are essential for the operation of the fluid type process.

It has been proposed to remove catalyst from the reactor and to treat it with a solvent to remove the materials contained therein. Not only is this an expensive operation, but it is impossible to remove completely the deposit from the catalyst by solvent extraction. It is also possible to burn the deposit from the catalyst, but in this case the catalyst must be reduced before reemployment and it frequently suffers deterioration during the cycle. Beside the association of the catalyst within the synthesis reactor with heavy oil and waxy materials, another part of the catalyst is also closely associated with heavy oil in the catalyst recovery system. When up-flowing synthesis gas is contacted with a dense bed of turbulent fluidized catalyst particles, the product stream comprising reaction products, unreacted gases and catalyst fines generally pass in the upper section of the reactor through a gas-solids separator, such as a cyclone, wherein the greater part of the catalyst fines and entrained catalyst particles is removed from the gas stream and returned to the catalyst dense bed. However, a minor portion of the catalyst is not removed by this means, and to prevent such catalyst fines that remain suspended in the vapors leaving the gas-solids separator from contaminating the liquid product, it is customary to contact the product vapors with a circulating oil stream to scrub out the remaining catalyst from the product stream. The resultant slurry is then settled or concentrated by some conventional means, such as thickening, and the thickened material usually discarded.

As a result therefore, of the formation of waxy deposits on synthesis catalyst within the reactor and of the product vapor scrubbing process wherein catalyst is scrubbed from hydrocarbon synthesis product vapors, there is lost not only catalyst but also a significant proportion of product oil—i. e., that associated with the catalyst within and without the reactor.

It is therefore, the main object of the present invention to separate oily or waxy material from finely divided hydrocarbon synthesis catalyst, simultaneously purifying the latter and recovering valuable oily material.

Another object of the invention is to recover a high quality diesel oil from the hydrocarbon synthesis process.

Other and further objects of the invention will appear from the following more detailed description.

The present invention discloses a method of simultaneously removing the waxy material from catalyst and the oil from fines by hydrogenation. The catalyst from the two sources, the reactor and the recovery system is mixed as a slurry with high-boiling (400+° F.) synthesis product in a reactor and subjected to low pressure hydrogenation. This operation consists of passing the slurry with hydrogen through a reactor at pressures in the order of 150 to 750 p. s. i. and temperatures of about 500° to 800° F.

Not only are the olefinic constituents of the oil phase of the slurry hydrogenated and oxygenated materials converted so that an excellent diesel oil in the order of 60 to 70 cetane number is obtained, but also the heavy oil and the wax are removed from the catalyst. Furthermore, the catalyst is also partially reduced in case it was oxidized in the reactor. Under the conditions specified, the hydrocarbon synthesis catalyst itself acts as the hydrogenation catalyst and no other catalyst need be added for the desired reaction. Inasmuch as a hydrogen manufacturing plant is almost invariably a part of a synthesis plant to reduce the feed catalyst, such plant is readily adaptable to furnish the hydrogen for use in accordance with the present invention.

Having set forth the general nature, advantages, and objects of the invention, the latter will best be understood from the more detailed description hereinafter in which reference will be made to the accompanying drawing which is a diagrammatic representation of a system suitable to carry out a preferred embodiment of the invention.

Referring now in detail to the accompanying drawing, 2 is a reactor preferably in the form of a vertical cylinder with a conical base and an upper expanded section, having a screen or grid 4 located in the lower section to effect good gas distribution, and a catalyst withdrawal line 6 extending through grid 4. A synthesis gas feed mixture of $H_2$ and $CO$ in synthesis proportions, that is, a mol ratio of $H_2$ to $CO$ of about 0.7 to 1.8 to 1, is introduced into the reactor through line 8 and flows upwardly through grid 4.

Within reactor 2 a mass of powdered iron catalyst, such as alkali metal promoted sintered reduced pyrites ash is maintained in the form of a dense fluidized bed, having particle size distribution such that less than 10% of these particles have diameters of 0–20 microns, and all of the material is finer than 100 mesh. This catalyst may be supplied to reactor 2 through line 10 from catalyst hopper 12. The linear velocity of the gases within reactor 2 is within the approximate range of 0.3 to 1.5 feet per second, and under these circumstances the catalyst assumes the form of a dense, turbulent mass, having a well-defined upper level and an "aerated" density of about 30–150 lbs./cu. ft. depending upon fluidization conditions. The pressure within the reactor may vary from about 250 to 750 p. s. i. g., and the reaction temperature, which may be controlled with the aid of cooling coils (not shown) located in the dense phase of the catalyst bed, is kept uniform at about 450°–750° F.

The catalyst is preferably promoted with about 0.3 to 1.5% of an alkali salt, such as $K_2CO_3$, $Na_2CO_3$, $KF$, etc. Higher concentrations, particularly in the presence of catalyst fines in the 0–20 micron range favor formation of high boiling and waxy materials. Furthermore, even when the total promoter content on the catalyst is within the above range, the presence of high concentrations of 0–20 micron fines is undesirable from a wax forming point of view because the finer catalyst usually contains the highest concentration of promoter which has been found to increase wax accumulation. Also, fines are usually more highly oxidized than coarser catalyst, and a catalyst oxygen content above about 15% definitely promotes formation of wax deposits.

When entering the enlarged section of reactor 2 the gas velocity is sufficiently decreased so that the gases no longer support any substantial quantity of catalyst, and most of the coarser particles entrained in the gas drop back into the fluidized mass.

The volatile reaction products containing as well varying quantities of entrained catalyst fines and also finely divided organic iron compounds are withdrawn through a gas-solids separator, such as cyclone 14 equipped with dip pipe 16. The bulk of the entrained catalyst fines is removed in the cyclone and returned to the fluidized bed via dip pipe 16.

The reaction products and the remaining catalyst fines, etc. and undesirable synthesis product contaminants, such as entrained iron salts of fatty acids are passed from the top of reactor 2 through line 17 and may be partially condensed in cooler 18. The reaction products and catalyst fines are then passed into oil scrubber 20 wherein the remaining entrained catalyst powder is removed by circulating product oil in a manner known per se. The temperature within scrubber 20 is preferably above 175–250° F. so that lighter and lower boiling vapors are not substantially scrubbed out by the oil. The overhead vapors and gases from scrubber 20, comprising tail gas and reaction products uncondensed in cooler 18 and scrubber 20 are then passed through line 22 to cooler 24 and partial condenser 26. The latter are operated at such temperatures that reaction products boiling above 400° F. are substantially condensed in 26 but lighter reaction products pass overhead as vapor through line 28, are substantially cooled in cooler 30 and pass to separator 32 wherein normally condensible synthesis products are withdrawn and sent via line 34 to the liquid products recovery system. Non-condensible tail gas from 32 is removed overhead through line 36, a portion sent back as recycle to reactor 2 via line 38, and the balance withdrawn through line 40, used in the plant as desired, such as fuel, recycle to gas generator, etc.

The condensate in separator 26, comprising oily synthesis products boiling above 400° F. is withdrawn through line 42, and, as required, sent as scrubbing oil to catalyst scrubber 20 via line 44. A portion of the condensate from 26 may be sent to the liquid products recovery system.

A liquid stream comprising scrubbing oil, scrubbed catalyst fines, and other condensed, scrubbed, or entrained reaction products, such as organic iron salts is withdrawn from oil scrubber 20 and passed through line 46 to slurry mixing tank 48, preferably equipped with means of mechanical agitation.

Returning now to reactor 2, a stream of catalyst is intermittently or continuously withdrawn from the dense bed through catalyst withdrawal line 6, which may be provided with aeration taps 50 to aid in the moving of the catalyst through the line. Catalyst is preferably withdrawn from reactor 2 as wax accumulates, evidenced by decrease in fluidizability, and is passed to slurry mixing tank 48. Catalyst and liquid stream from 20 are preferably so proportioned that the resulting slurry has a composition of about 1–3 lbs. catalyst per gallon of oil.

The catalyst-oil slurry is now pumped through slurry pump 52 and line 54 to hydrogenation reactor 56. This is a reactor of conventional design, which may be packed with non-catalytic material, such as Raschig rings, pumice, activated carbon, etc. to aid in the mutual contacting of liquids, gases, and finely-divided catalytic solids. Because of the nature of the synthesis catalyst, no extraneous hydrogenation catalyst need be added to reactor 56. Hydrogen from any convenient source, as from the hydrogen manufacturing plant commonly associated with a synthesis plant is supplied to reactor 56 through line 58. Reactor 56 is under pressure of about 50 to 750 p. s. i., preferably 300 to 500 p. s. i., and a temperature of about 500°–800° F. Under these conditions not only are the oxygenated organic compounds present in the 400+° F. products comprising the slurry reduced, and the olefinic constituents saturated, but also the waxy constituents deposited on the synthesis catalyst are removed partly by solution in the slurry oil, and partly by being broken down to smaller molecular fragments as a result of the hydrogenation. Also, organic iron salts coming overhead with the fines are reduced during the hydrogenation and thus an increase in product yield is realized. Furthermore, any oxidized synthesis catalyst is partially reduced. As pointed out above, this is of great advantage, because oxidized synthesis catalyst favors wax formation.

Hydrogen may be withdrawn from reactor 56 and at least in part recycled through lines 55 and 63, and 68. Recycle hydrogen rates in the order of 2000–10,000 cubic feet/barrel of oil are advantageously employed, and the liquid throughput through reactor 56 is about 1 to 5 liquid volumes per volume reactor per hour.

Also withdrawn overhead through line 55 are volatile decomposition products resulting from the hydrogenation reaction, such as volatile hydrocarbons, water, etc. The overhead exit stream from 56 and withdrawn through line 55 may advantageously pass through cooler 57 and separator 61, wherein normally condensible material is cooled and separates out as a liquid. This liquid, comprising lower molecular weight hydrocarbons, water, etc. may be sent to its own liquid products separating and fractionation system through line 65.

After the desired conversion in reactor 56, a slurry containing now cleaned reduced catalyst and saturated oil with little or no oxygen content is withdrawn from 56 through line 60 and is pumped to filter 62, which may be of any conventional type, such as a rotary press, plate and frame, etc. for removing solids from liquids. The liquid product from filter 62 may be withdrawn through line 69 and may be further processed if necessary. Even without further processing it is suitable for use as a diesel fuel, having high cetane values of from 60–70.

Catalyst from which the bulk of adhering oil has been removed during the filtration process and which is substantially free of wax is withdrawn from filter 62, and is conveyed by any suitable means, such as conveyors, lock hoppers, etc., through line 64 to catalyst hopper 12, for reuse in the system.

By the term "wax" there is considered here those deposits on catalyst which are soluble in benzene and which are substantially composed of hydrogen and carbon only.

If the quantity of fines in the slurry is such that, when composited with the dewaxed catalyst, it amounts to more than about 10% of the total, the filtered material is preferably passed through a classification zone 66, such as a screen or other means of classification known in the art, to remove the fines prior to returning catalyst to hopper 12.

The invention admits of numerous modifications apparent to those skilled in the art. Thus mention has not been made of various accessory equipment which normally would be used in a commercial plant. Thus in the interests of good heat economy, various heat exchangers and economizers would be employed to utilize whatever heat is available in the most efficient manner and, in order to control the process, pumps, compressors, flow meters, etc. would be included in the equipment.

The foregoing description and exemplary operations have served to illustrate specific applications of the invention. However, other modifications obvious to those skilled in the art are within the scope and spirit of the invention.

What is claimed is:

1. The process for producing valuable hydrocarbons of high cetane value and simultaneously dewaxing hydrocarbon synthesis catalyst which comprises reacting carbon oxides and hydrogen in the presence of a finely divided iron-type synthesis catalyst in a synthesis zone under synthesis conditions, maintaining a fluidized bed of said catalyst in said synthesis zone, withdrawing a portion of said fluidized catalyst from said synthesis zone, continuously withdrawing gaseous and vaporous products and entrained catalyst of smaller than fluidizable particle size and solids from the top of said reaction zone, contacting said gases, vapors and entrained catalyst and solids with oil to separate entrained catalyst and solids in an oil scrubbing zone, withdrawing oil and scrubbed out catalyst and solids from that zone, forming a slurry comprising said withdrawn oil and its entrained solids and catalyst and said portion of fluidized catalyst withdrawn from said synthesis zone, introducing said slurry into a hydrogenation zone, subjecting said slurry to a hydrogenation reaction with hydrogen under conditions comprising 250–750 p. s. i. and 600°–800° F., withdrawing a mixture of oil and catalyst from said hydrogenation zone, separating said withdrawn mixture in a filtration zone into catalyst and an oil product containing valuable hydrocarbons of high cetane value, recycling at least a portion of said catalyst to said synthesis zone, and recovering said separated oil product.

2. The process of claim 1 wherein said scrubbing oil boils above 400° F.

3. The process of claim 1 wherein said scrubbing oil is a product of said synthesis reaction.

4. The process of claim 1 wherein said catalyst is subjected to classification to remove fines prior to recycle to said synthesis zone.

5. The process for producing valuable hydrocarbons of improved cetane value and simultaneously regenerating hydrocarbon synthesis catalyst which comprises reacting carbon monoxide and hydrogen in the presence of a finely divided iron-type synthesis catalyst in a synthesis zone under synthesis conditions, maintaining a fluidized bed of said catalyst in said synthesis zone, withdrawing gaseous effluent products containing entrained catalyst particles from said synthesis zone, recovering a liquid oil from said effluent products, scrubbing said gaseous effluent products with said liquid oil, forming a slurry comprising said entrained catalyst particles in said scrubbing liquid oil, introducing said slurry into a hydrogenation zone, subjecting said slurry to a hydrogenation reaction with hydrogen under a pressure of about 500 to 750 lbs. per square inch and a temperature of about 600°–800° F., withdrawing a mixture of oil and catalyst from said hydrogenation zone, recycling at least a portion of said withdrawn catalyst to said synthesis zone and segregating an oil product from said withdrawn mixture characterized by the inclusion of hydrocarbons of improved cetane value.

CHARLES E. HEMMINGER.

References Cited in the file of this patent

UNITED STATES PATENTS

| Number | Name | Date |
|---|---|---|
| 2,360,787 | Murphree | Oct. 17, 1944 |
| 2,414,276 | Sensel et al. | Jan. 14, 1947 |
| 2,436,568 | Griffin et al. | Feb. 24, 1948 |
| 2,483,771 | Holder | Oct. 4, 1949 |